(12) United States Patent
Brix et al.

(10) Patent No.: US 7,229,584 B2
(45) Date of Patent: Jun. 12, 2007

(54) METHOD AND APPARATUS FOR INJECTION MOLDING MULTI-COMPONENT MIXTURES

(75) Inventors: Helmut Brix, Wohlmirstedt (DE); Gerhard Rapp, Freiberg/Neckar (DE)

(73) Assignee: Demag Ergotech GmbH, Schwaig (DE)

( * ) Notice: Subject to any disclaimer, the term of this patent is extended or adjusted under 35 U.S.C. 154(b) by 32 days.

(21) Appl. No.: 10/243,618

(22) Filed: Sep. 13, 2002

(65) Prior Publication Data

US 2003/0057606 A1 Mar. 27, 2003

(30) Foreign Application Priority Data

Sep. 14, 2001 (DE) ................................ 101 45 560

(51) Int. Cl.
*B29C 45/02* (2006.01)

(52) U.S. Cl. ............................ 264/328.18; 264/328.19

(58) Field of Classification Search ............ 264/328.6, 264/328.8, 328.17, 328.18, 328.19, 560, 264/585, 328.4; 425/130, 557, 558, 559; 366/77, 132, 184, 189, 192
See application file for complete search history.

(56) References Cited

U.S. PATENT DOCUMENTS

| | | | | |
|---|---|---|---|---|
| 3,728,053 A | * | 4/1973 | Stillhard et al. | 425/4 R |
| 4,124,308 A | * | 11/1978 | Sokolow | 366/77 |
| 4,390,332 A | * | 6/1983 | Hendry | 425/4 R |
| 4,591,467 A | * | 5/1986 | Kopernicky | 264/37.17 |
| 5,286,187 A | * | 2/1994 | Niimi et al. | 425/205 |
| 5,454,995 A | * | 10/1995 | Rusconi et al. | 264/328.8 |
| 5,543,092 A | * | 8/1996 | Ibar | 264/40.1 |
| 6,071,462 A | * | 6/2000 | Putsch | 264/328.14 |
| 6,109,909 A | * | 8/2000 | Morita | 425/557 |
| 6,254,813 B1 | * | 7/2001 | Eckardt et al. | 264/39 |
| 6,576,179 B1 | * | 6/2003 | Abe et al. | 264/328.18 |

FOREIGN PATENT DOCUMENTS

| | | |
|---|---|---|
| AT | 002 517 U1 | 12/1998 |
| DE | 1 554 999 B | 3/1970 |
| DE | 34 00 309 A1 | 8/1985 |

OTHER PUBLICATIONS

Rosato, Dominick V., Donald V. Rosato, and Marlene G. Rosato. Injection Molding Handbook. 3rd edi. Boston: Kluwer Academic Publishers. 2000. pp. 900-901.*

* cited by examiner

*Primary Examiner*—Christina Johnson
*Assistant Examiner*—Monica A Huson
(74) *Attorney, Agent, or Firm*—Henry M. Feiereisen (57) ABSTRACT

In a method and apparatus for injection molding a multi-component mixture, in particular liquid silicone rubber; a starting material, containing at least two components and, optionally, at least one additive, is conveyed from a storage and metering assembly through a mixer for mixing the starting material, to a reservoir at an amount which is a multiple of an amount required for an injection molding cycle. The mixed starting material is transferred in increments from the reservoir to an injection unit of an injection molding machine. When the reservoir is emptied to a predetermined level a multiple of the amount of starting material required for the injection molding cycle is fed to the reservoir.

6 Claims, 6 Drawing Sheets

METHOD AND APPARATUS FOR INJECTION MOLDING MULTI-COMPONENT MIXTURES

CROSS-REFERENCES TO RELATED APPLICATIONS

This application claims the priority of German Patent Application, Ser. No. 101 45 560.7, filed Sep. 14, 2001, pursuant to 35 U.S.C. 119(a)–(d), the subject matter of which is incorporated herein by reference.

BACKGROUND OF THE INVENTION

The present invention relates to a method and apparatus for injection molding multi-component mixtures, in particular liquid silicone rubber.

Silicone rubber is a generic term for a particular elastomer based on siloxane and has a chemical structure which is characterized by the siloxane chain (—Si—O—Si—O—), whereby organic methyl groups, phenyl groups, hydroxyl groups or the like are bounded as ligands. A distinction is made between solid silicone rubbers and liquid silicone rubbers (LSR) whereby the difference is characterized by their chain length. While liquid silicones are composed of a union of up to 1000 molecules, solid silicones contain a union of up to 6000–10000 molecules. As far as silicone cross-linking is concerned, two groups are distinguished: the RTV type (cross-linked at room temperature), and the HTV type (cross-linked at high temperature), i.e. cross-linked under hot-vulcanization condition.

The present invention relates primarily to the area of liquid silicones of the HTV type which become increasingly more relevant in the field of injection molding. This type of liquid silicones are two-component mixtures made of low viscous vinyl—or hydrogen-functional polysiloxanes with fillers and small quantities of a platinum catalyst which react according to the principle of the addition cross-linkage. The term "addition cross-linkage" denotes hereby a reaction of educts with one another under the influence of a catalyst to produce the end product, without formation of a cleavage product. These mixtures contain further an inhibitor, also called pot life regulator, to influence the period until commencement of cross-linkage. The inhibitor is added to one component whereas the catalytic cross-linkage agent is added to the other component of the two-component mixtures. This means in the context of liquid silicones that hydrogen-functional polysiloxane bonds with vinyl-functional polysiloxane under the influence of the catalyst which impacts only the reaction speed and is still in original state after the reaction.

Another method for making a two-component mixture involves peroxide cross-linkage where organic peroxides dissociate into free radicals as a consequence of the instability of the O—O bond under the influence of heat. The radicals react with the vinyl groups or methyl groups of the polysiloxane structure while forming hydroxyl compounds and enable in this way cross-linkage that leads to the formation of an atomic union between the individual monomers.

Figure 1:
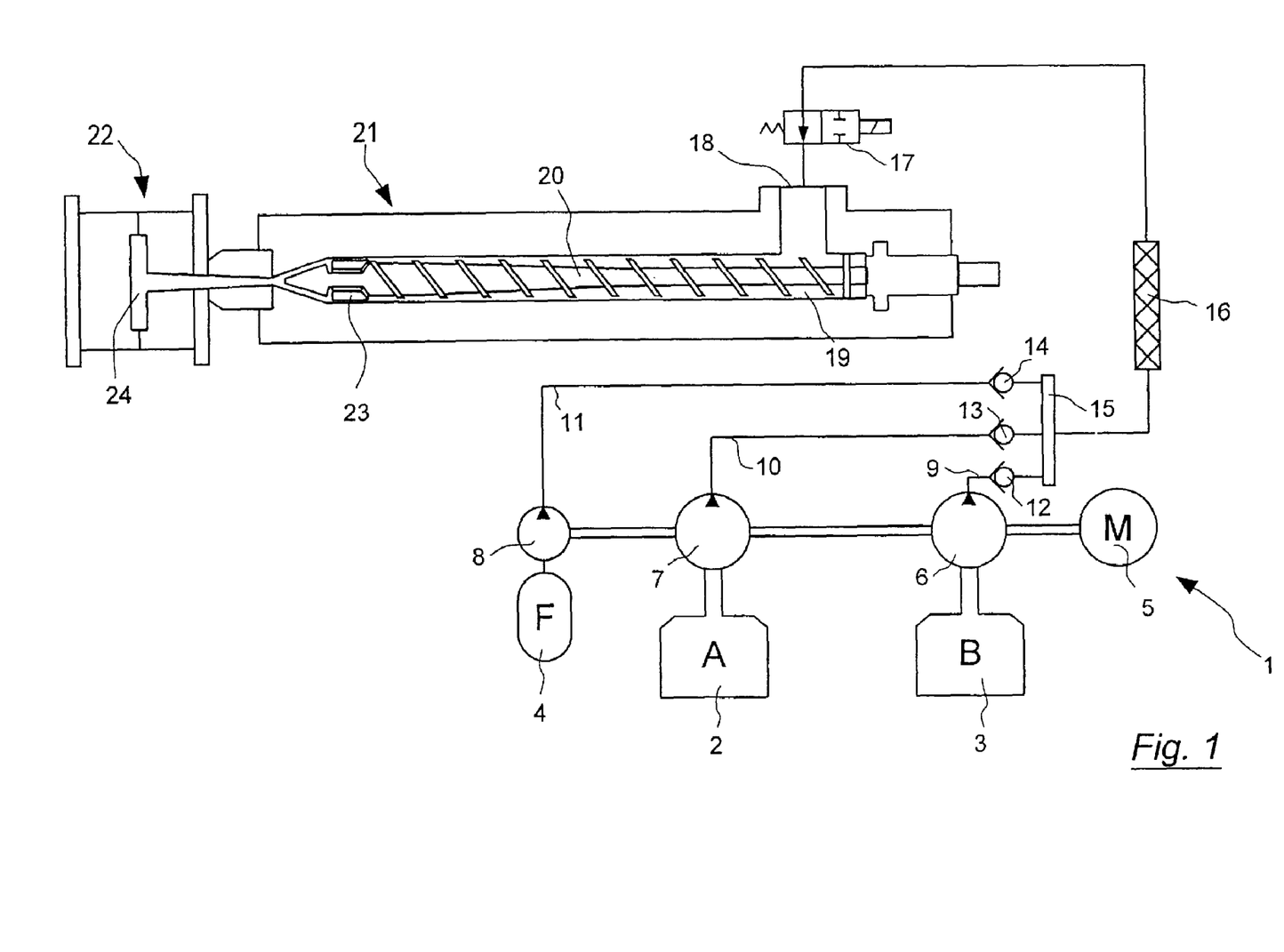
FIG. 1 is a schematic illustration of a conventional injection molding machine.

Turning now to FIG. 1, there is shown a conventional injection molding machine for injection molding formed parts made of liquid silicone rubber. Reference is also made in this context to German publication no. DE 34 003 09 A1. The injection molding machine includes a metering assembly 1 which has a storage tank 2 for containing component A, a storage tank 3 for containing component B as well as a storage tank 4 for containing an additive or a coloring agent F. A motor 5 drives barrel pumps 6, 7, 8 to transport the starting components A, B and the additive (or coloring agent) F through tubular conduits 9, 10, 11 via respective check valves 12, 13, 14 and a mixing head 15 to a static mixer 16. The actual mixing of the components is implemented in the static mixer 16 by means of flow dividing elements by which the material stream is layered many times. Subsequently, the mixture is fed via a shut-off valve 17 and a fitting 18 into the feed zone 19 of a plastification screw 20 of a plastification and injection unit 21. The rotary motion of the plastification screw 20 moves the material to an antechamber in front of the screw 20 in order to improve a mixing of the components through dynamic mixture. The screw cylinder is equipped with a water-based temperature-moderating structure to prevent excessive heating of the mixture. During subsequent injection operation, the screw 20 operates as plunger which forces material via a, not shown, cold runner system into a molding tool 22. Backflow of the very low-viscous mixture from the antechamber into the leading screw space is prevented by a particular backflow valve (LSR design) 23. Addition cross-linkage is realized in cavity 24 as soon as the required activation energy is exceeded as a result of a heating of the mixture. Vulcanization is effected at a temperature of about 170–200° C. and at cross-linking speeds of about 5 s/mm wall thickness of the formed part.

A main field of application for liquid silicone rubbers are small items such as, e.g., baby bottle nipples, mouth pieces of anesthetic equipments, and seals for various purposes, e.g., seal for a plunger of a syringe in the medical field or O rings in the automobile industry and engineering.

Conventional metering assemblies convey both components A and B at a particular, adjustable pressure from the storage tanks 2, 3, through the static mixer 16 directly into the plastification and injection unit 21 of the injection molding machine. As the distance traveled by the material during transport between the storage tanks 2, 3 and the plastification and injection unit 21 is oftentimes very long, the pressure may fluctuate in the area of the feed zone of the plastification and injection unit so that the material intake is uneven, resulting in metering variations or variations of the shot weight. In particular, when smallest amounts of liquid silicone are processed, problems can be encountered that adversely affect the overall quality of the molding result because injection of material may be insufficient or may even be excessive. Another problem involves the very small throughput of the components through the static mixer as a consequence of the small shot weights because the components are not thoroughly mixed enough.

It would therefore be desirable and advantageous to provide an improved method and apparatus for injection molding liquid silicone rubber or other mixtures comprised of several components, to obviate prior art shortcomings and to allow a thorough mixture of the components while avoiding pressure fluctuations in the area of the feed zone of the plastification and injection unit.

SUMMARY OF THE INVENTION

According to one aspect of the present invention, a method for injection molding a multi-component mixture, in particular liquid silicone rubber; includes the steps of conveying a starting material, containing at least two components and, optionally, at least one additive, from a storage and metering assembly through a mixer for mixing the starting material, to a reservoir at an amount which is a multiple of an amount required for an injection molding cycle; transferring the mixed starting material in increments from the reservoir to an injection unit of an injection molding machine; and supplying a multiple of the amount of starting material required for the injection molding cycle to the reservoir, when the reservoir is emptied to a predetermined level.

The present invention resolves prior art problems by conveying starting material through the mixer at an amount which is a multiple of the amount needed for an injection molding cycle. As a result the mixing result is much improved.

According to another aspect of the present invention, a method for injection molding a multi-component mixture, in particular liquid silicone rubber, includes the steps of conveying a starting material, containing at least two components and, optionally, at least one additive, from a storage and metering assembly through a mixer for mixing the starting material, to two reservoirs in alternating fashion at an amount which is a multiple of an amount required for an injection molding cycle; transferring the mixture in increments from the reservoirs to an injection unit of an injection molding machine; and supplying a multiple of the amount of starting material required for the injection molding cycle to the reservoirs, when the reservoirs are emptied to a predetermined level, whereby one of the reservoirs is intended to deliver mixed starting material to the injection unit, while the other reservoir is being filled with mixed starting material.

According to still another aspect of the present invention, an apparatus for injection molding a multi-component mixture, in particular liquid silicone rubber, includes a storage and metering assembly for conveying a starting material containing at least two components and, optionally, at least one additive; a mixer receiving the starting material from the storage and metering assembly to provide a mixture of the starting material; an injection unit receiving the mixture from the mixer for injection into a molding tool; and a reservoir positioned between the injection unit and the mixer and dimensioned to receive a multiple of an amount of starting material required for an injection molding cycle.

According to still another aspect of the present invention, an apparatus for injection molding a multi-component mixture, in particular liquid silicone rubber, includes a storage and metering assembly for conveying a starting material containing at least two components and, optionally, at least one additive; a mixer receiving the starting material from the storage and metering assembly to provide a mixture of the starting material; an injection unit receiving the mixture from the mixer for injection into a molding tool; and a pair of reservoirs positioned between the injection unit and the mixer and dimensioned to receive a multiple of an amount of starting material required for an injection molding cycle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 2:
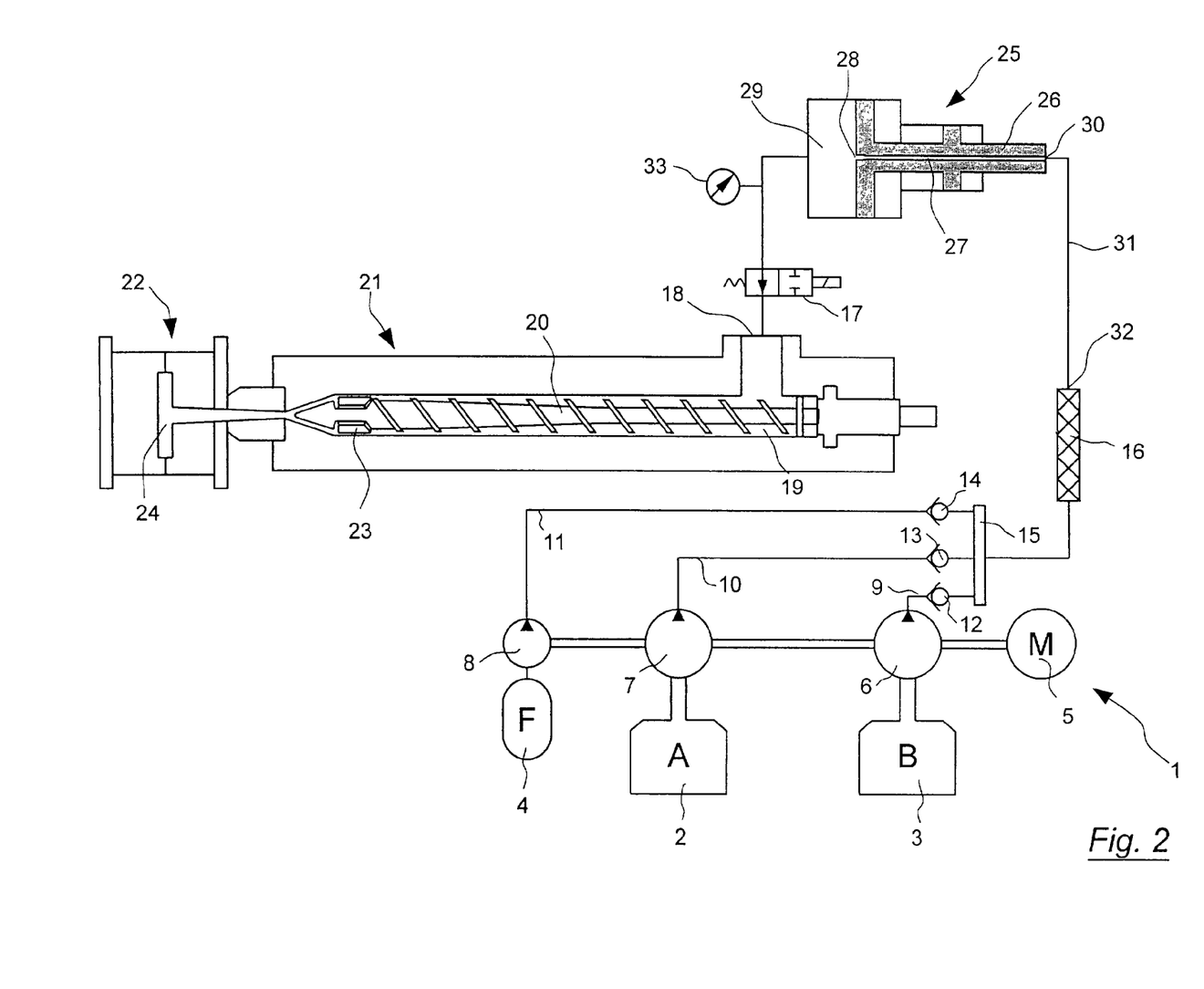
FIG. 2 is a schematic illustration of a first embodiment of an injection molding machine according to the present invention.
Figure 5:
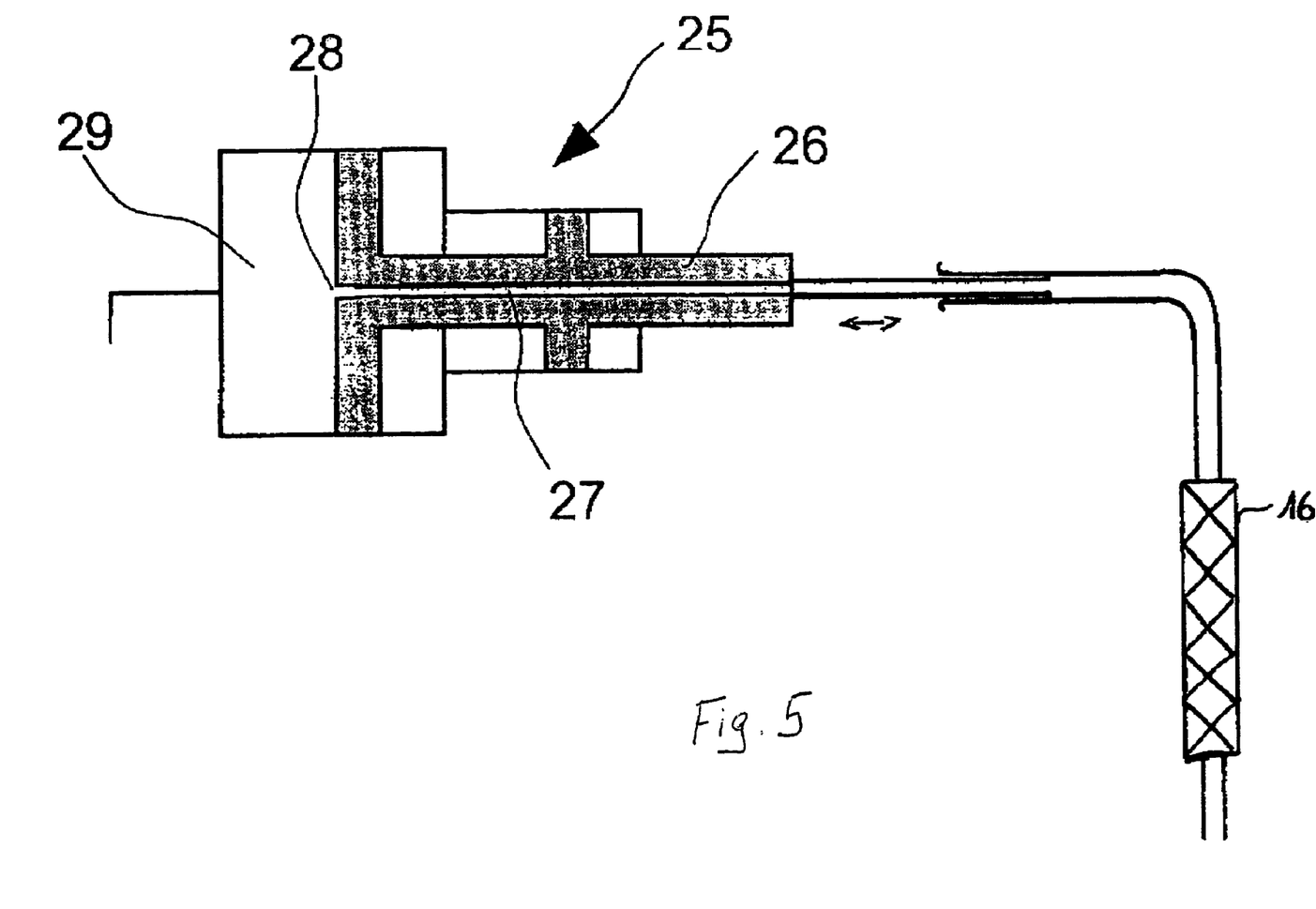
FIG. 5 is a schematic illustration of a modified connection between mixer and reservoir for an injection molding machine according to the present invention.

Turning now to the drawing, and in particular to FIG. 2, there is shown a schematic illustration of a first embodiment of an injection molding machine according to the present invention for injection molding liquid silicone rubber. Parts corresponding with those in FIG. 1. are denoted by identical reference numerals and not explained again. In accordance with the present invention, provision is made for a buffer in the form of a metering cylinder, generally designated by reference numeral 25 and positioned between the static mixer 15 and the shut-off valve 17 of the plastification and injection unit 21. Accommodated in the metering cylinder 25 is a metering plunger 26 which has formed therein a channel 29 with a leading end 28 connecting into an antechamber 29 in front of the metering plunger 26 to serve as reservoir 29. The trailing end 30 of the channel 27 is fluidly connected via a tubular conduit 31 with an exit port 32 of the static mixer 16. As an alternative, the fluid connection may also be realized via a telescopic pipe connection, as shown in FIG. 5. The reservoir 29 is fluidly connected via shut-off valve 17 to the entry zone 18 of the plastification and injection unit 21, whereby a pressure sensor 33 provides constant pressure conditions in the reservoir 29.

Although not shown in FIG. 2, there may be provided in addition to the check valves 12, 13, 14, disposed upstream of the mixing head 15, a further check valve in the channel 27. Also not shown is a cooling structure for the metering cylinder 25 and the metering plunger 26 to maintain proper temperature of the mixture.

The injection molding machine of FIG. 2 operates as follows: By setting a suitable pressure in the storage and metering assembly 1 and a suitable output of the motor 5 and the pumps 6, 7, 8, the components A, B as well as additive (or coloring agent) F in the storage tank 4 are conveyed to the static mixer 16 and mixed there. The resultant mixture then advances through tubular conduit 31 and via channel 27 of the metering plunger 26 into the reservoir 29. As a consequence, the mixture fills the reservoir 29 as the metering plunger 26 moves back until reaching an end position. When the metering plunger 26 reached the end position, the filling operation of the reservoir 29 is over. As the plastification screw 20 rotates, a desired amount of mixture is actively drawn into the feed zone 19 of the plastification and injection unit 21 while a commensurate advance of the metering plunger 26 maintains a constant pressure in the reservoir 29. The movement of the metering plunger 26 may hereby be implemented by any suitable hydraulic, electric or pneumatic drives.

Each injection molding cycle results in an increment advance of the metering plunger 26 by a distance which corresponds to the required quantity of mixture for executing an injection molding cycle. Thus, the reservoir 29 is emptied in increments by the respective shot weight. Once the metering plunger 26 reaches an adjustable forward end position, the pumps 6, 7, 8 are activated to force new material into the metering cylinder 25 at a pressure which is higher than the pressure in the reservoir 29. As the pressure sensor 33 maintains a constant pressure in the reservoir 29, the metering plunger 26 moves back until reaching the rear end position. During filling procedure of the reservoir 29, there is no need to interrupt the injection molding process.

Figure 3:
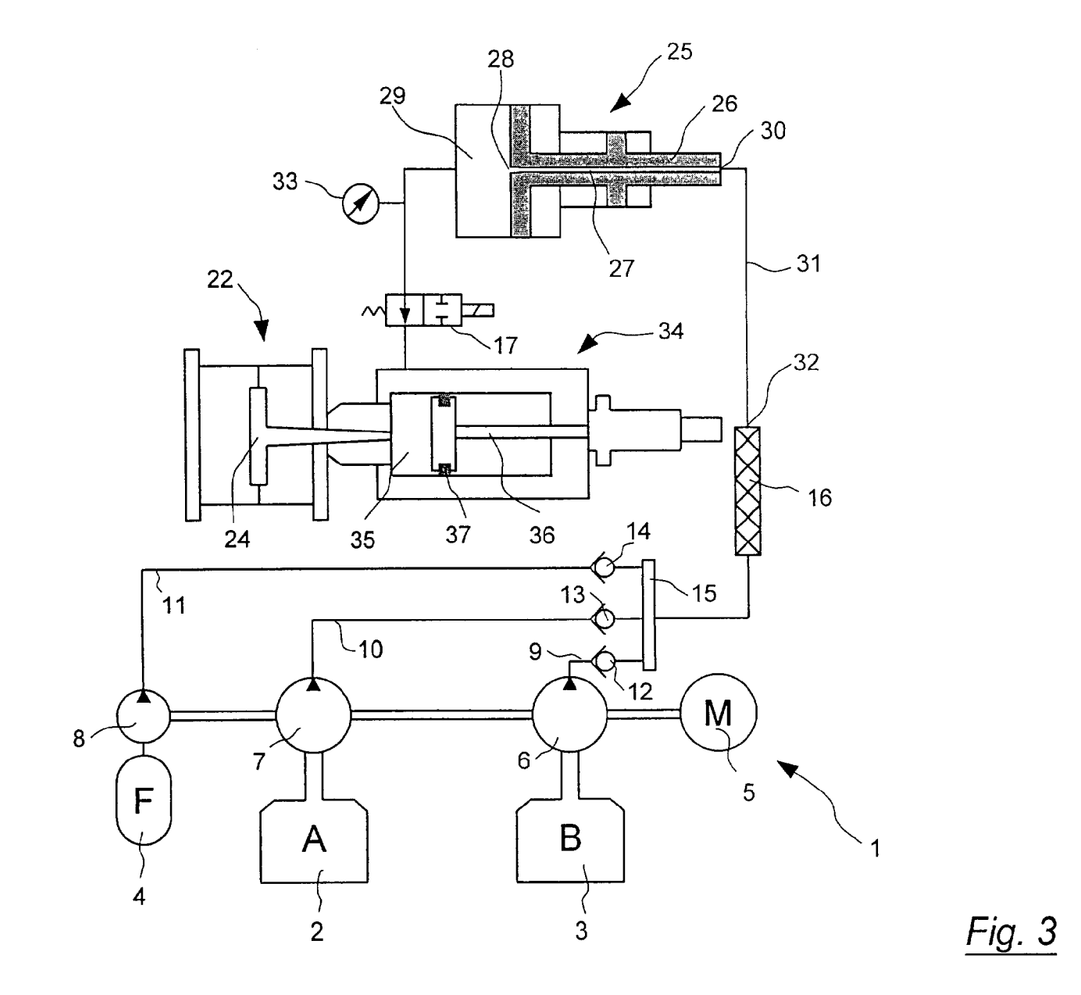
FIG. 3 is a schematic illustration of a second embodiment of an injection molding machine according to the present invention.

Referring now to FIG. 3, there is shown a schematic illustration of a second embodiment of an injection molding machine according to the present invention. Parts corresponding with those in FIG. 2 are denoted by identical reference numerals and not explained again. In this embodiment, provision is made for an injection unit in the form of a plunger-type injection unit, generally designated by reference numeral 34. The plunger-type injection unit 34 has an injection plunger 36 which moves within a cylinder 56 and defines with the cylinder 56 an antechamber 35 in front of the injection plunger 36. Filling of the antechamber 35 is realized by lateral fill openings, indicated at reference numeral 57, in a forward area of the antechamber 35. Of course, filling of the antechamber 35 may also be implemented in a manner analogous to the metering cylinder 25 of the embodiment of FIG. 2, i.e. via a channel extending through the injection plunger 36 and having a trailing end fluidly connected with the exit opening of the reservoir 29 via a tubular conduit. As an alternative, the fluid connection may also be realized via a telescopic pipe connection, as shown by way of example in FIG. 5. Normally, the antechamber 35 is filled with the respective shot weight plus the amount of mixture required for applying the after-pressure. As a consequence of the low viscosity of the liquid silicone rubber mixture, the injection plunger 36 is suitably provided with elastic members 37, e.g., O rings, about its outer wall that glides along the cylinder 56.

As the dynamic mixture through a plastification screw downstream of the reservoir 29 is omitted in the configuration of the injection unit in the form of a plunger-type injection unit according to FIG. 3, it may be necessary to replace the static mixer with a dynamic mixer, even though the higher throughput amount by the static mixer attains more thorough mixing results, when compared with prior art devices.

The mode of operation of the injection molding machine of FIG. 3 is similar to the injection molding machine of FIG. 2, i.e. the reservoir 29 of the metering cylinder 25 receives an amount of mixture which is a multiple of the amount required for an injection molding cycle, i.e. the amount drawn from the reservoir 29 by the plunger-type injection unit 34 and forced into the molding tool 22.

Figure 4:
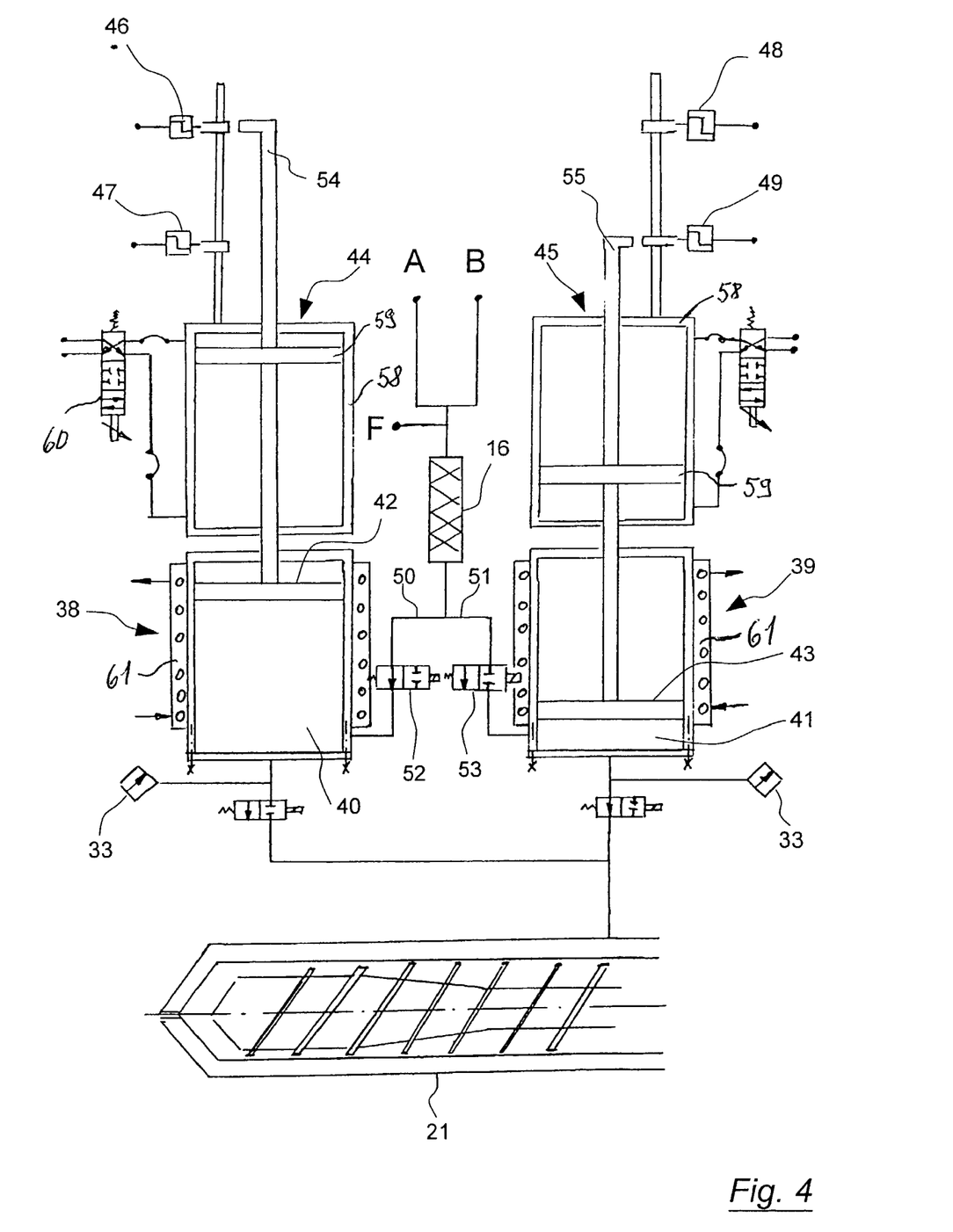
FIG. 4 is a schematic illustration of a third embodiment of an injection molding machine according to the present invention.

FIG. 4 shows a schematic illustration of a further variation of an injection molding machine according to the present invention. In this embodiment two metering cylinders 38, 39 are provided downstream of the mixer 16 so that two reservoirs 40, 41 can alternatingly be filled. In the non-limiting example of FIG. 4, the metering plungers 42, 43 are actuated by hydraulic piston and cylinder units 44, 45 and include piston rods 54, 55, whereby the piston rods 54, 55 are each extended outwards via another cylinder 58 with accommodated piston 59 to interact with position transmitters 46, 47 and 48, 49, respectively, so as to establish and ascertain the rear and front end positions of the metering plungers 42, 43. Control valves 60 are provided to assist a movement of the metering plungers 42, 43 through respective fluid regulation into the cylinders 59.

At operation of the injection molding machine of FIG. 4, the mixture of components A, B and additive (or coloring agent) F is alternately conveyed downstream of the static mixer 16 via tubular conduits 50, 51 and control valves 52, 53 into the reservoirs 40, 41 of the metering cylinders 38, 39. Pressure sensors 33 monitor the pressure in the respective reservoirs 40, 41 to keep the pressure constant. Suitably, the cylinders 38, 39 are each embraced by a cooling system 61.

The injection molding machine of FIG. 4 has the benefit that a re-charging of the one metering cylinder that has been emptied will not impact a metering operation of the plastification and injection unit 21 because the other metering cylinder, that has been filled previously, is then available for the injection molding process.

Figure 6:
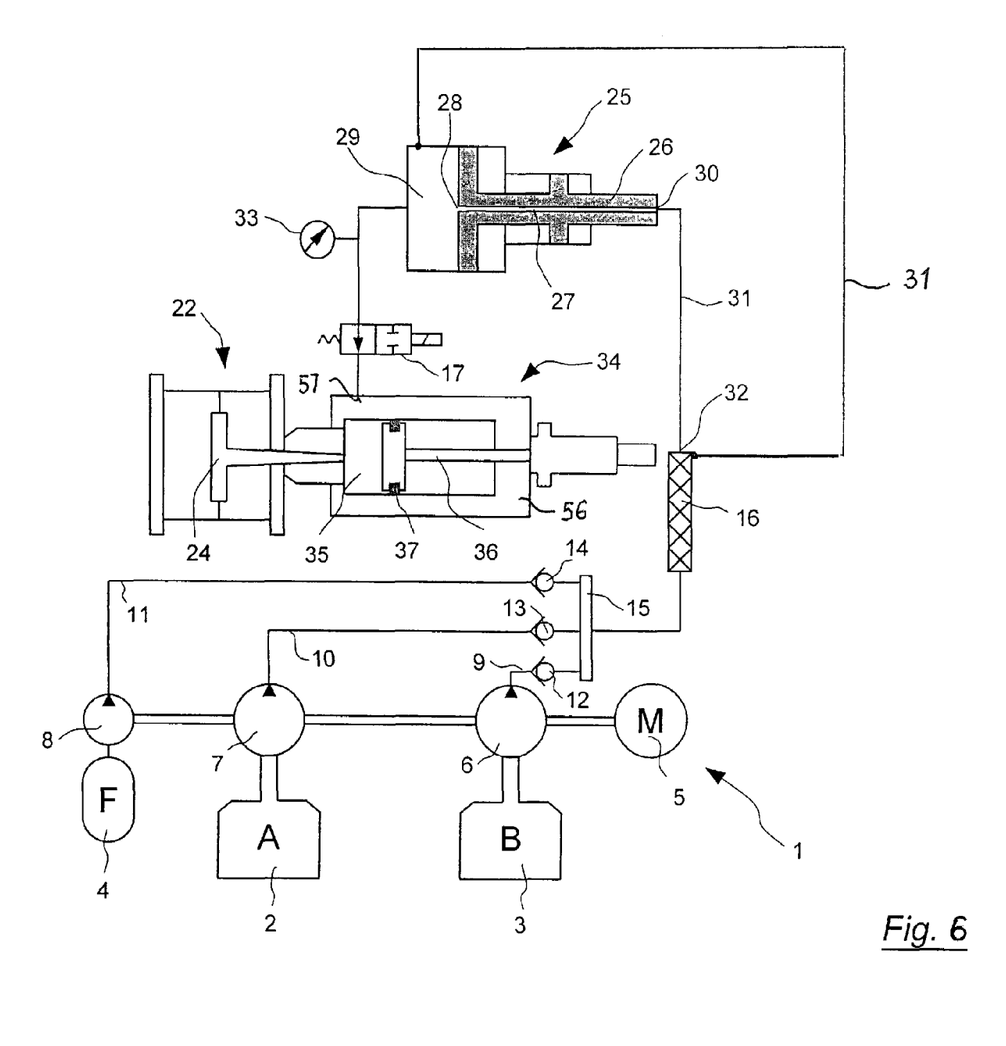
FIG. 6 is a schematic illustration of a variation of the injection molding machine of FIG. 3.

Referring now to FIG. 6, there is shown a schematic illustration of a variation of the injection molding machine of FIG. 3. Parts corresponding with those in FIG. 3 are denoted by identical reference numerals and not explained again. In this embodiment, provision is made, in addition to the fluid connection between the trailing end 30 of the channel 27 via tubular conduit 31 to exit port 32 of the static mixer 16, for the arrangement of at least one other fill opening at the forward end of the antechamber 29 which is fluidly connected via a further tubular conduit (or pipe connection) 31 with a further exit port of the static mixer 16. Of course, the provision of at least one other fill opening at the forward end of the antechamber 29, as shown in FIG. 6 by way of example, is equally applicable for the injection molding machine of FIG. 2.

It will be understood by persons skilled in the art that the principles described in the preceding description with respect to the processing of a liquid silicone rubber mixture are generally applicable to any mixtures of different components.

While the invention has been illustrated and described in connection with currently preferred embodiments shown and described in detail it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for injection molding a multi-component mixture, comprising the steps of:

mixing at least two separate components and, optionally, at least one additive, from a storage and metering assembly in a mixer to produce a mixture;

conveying the mixture to two separate reservoirs in alternating fashion at an amount which is greater than an amount required for an injection molding cycle;

transferring the mixture in increments from the reservoirs to a separate injection unit of an injection molding machine in the absence of an exchange of mixture between the reservoirs; and supplying the greater amount of mixture to the reservoirs, when the reservoirs are respectively emptied to a predetermined level, wherein one of the reservoirs delivers the mixture to the injection unit, while the other reservoir is being filled with the mixture.

2. The method of claim 1, wherein the transferring step includes a delivery of the mixture to the injection unit at an amount which is substantially commensurate with the amount required for an injection molding cycle.

3. The method of claim 1, wherein the reservoirs are substantially emptied, before the greater amount of mixture, required for the injection molding cycle, is respectively supplied to the reservoirs.

4. The method of claim 1, wherein each of the reservoirs is substantially filled completely during each supplying step.

5. The method of claim 1, wherein the conveying step includes filling each of the reservoirs by about three times to twenty times the amount of mixture required for the injection molding cycle.

6. The method of claim 5, wherein the conveying step includes filling each of the reservoirs by about five times to ten times the amount of mixture required for the injection molding cycle.

* * * * *